United States Patent [19]

Fischer et al.

[11] 4,053,541
[45] Oct. 11, 1977

[54] ACETOACETIC ACID PENTAERYTHRITE PHOSPHITE ESTER

[75] Inventors: Edgar Fischer, Frankfurt am Main; Otto Mauz, Liederbach, Taunus; Norbert Mayer; Gerhard Pfahler, both of Augsburg, all of Germany

[73] Assignee: Hoechst Aktiengesellschaft, Frankfurt am Main, Germany

[21] Appl. No.: 654,853

[22] Filed: Feb. 3, 1976

[30] Foreign Application Priority Data

Feb. 7, 1975 Germany .............................. 2505152

[51] Int. Cl.$^2$ .............................................. C07F 9/141
[52] U.S. Cl. ................................ 260/937; 260/45.8 R; 260/45.85 R; 260/971
[58] Field of Search .................................. 260/937, 971

[56] References Cited

U.S. PATENT DOCUMENTS

| 3,155,639 | 11/1964 | Emmons et al. ................. 260/937 X |
| 3,526,613 | 9/1970 | Reese et al. ...................... 260/937 X |
| 3,959,413 | 5/1976 | Schwarzenbach .............. 260/937 X |

OTHER PUBLICATIONS

Buehler et al., Survey of Organic Syntheses, Wiley-Interscience, New York (1970), pp. 811 and 812.

*Primary Examiner*—Richard L. Raymond
*Attorney, Agent, or Firm*—Connolly and Hutz

[57] ABSTRACT

Acetoacetic acid pentaerythrite phosphite ester may be easily mixed with polymers and improves their processing, color and weather stability.

1 Claim, No Drawings

ACETOACETIC ACID PENTAERYTHRITE PHOSPHITE ESTER

The present invention relates to acetoacetic acid pentaerythrite phosphite ester, its preparation and application.

As is known, the addition of phosphorus acid esters per se or in admixture with other stabilizers to polymer molding compositions improves the processing and color stability of these compositions as well as their weather resistance. Synergistic mixtures of phosphite and phenolic and/or sulfidic stabilizers and of phosphite and metal salts or organo-metal compounds and epoxy compounds are also known.

As phosphite stabilizers, there have been used hitherto derivatives of triphenyl phosphite, for example trisnonylphenyl phosphite, or alkyl phosphites. Since they are liquid substances, they can be homogeneously incorporated into powders or granules of plastics with great expenditure only. Recently, a number of solid, crystallized organic phosphites are available on the market, which phosphites in the form of fine dust can be distributed more easily and uniformly in the powders or granules.

A special class among the solid, crystallized phosphites are compounds having the following structure:

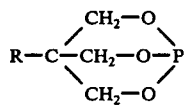

wherein R may be an alkyl radical having from 1 to 4 carbon atoms or an acyloxymethyl radical. By "acyl", there is to be understood the radical of a saturated or unsaturated aliphatic carboxylic acid or of an aromatic carboxylic acid (U.S. Pat. No. 3,155,703).

Compounds of the above kind, wherein R is alkyl, can be extremely toxic (J. E. Casida, Chemical Engineering News 52 (1974), p. 56). Thus, for example, it is known that the phosphite wherein R is isopropyl has an $LD_{50}$ value in mice of 0.22 mg/kg of body weight, while the corresponding phosphate has an $LD_{50}$ value of 0.18 mg/kg of body weight. The $LD_{50}$ value of the phosphite wherein R is ethyl is 1.1 mg/kg of body weight. These substances therefore are up to 30 times more toxic than known neurotoxins such as fluoro-di-isopropyl phosphate (DFP), and thus they belong to the group of "extremely toxic" or "very toxic" substances (see W. S. Spector, Handbook of Toxicology).

Phosphites of the cited structure, wherein R is an acyloxymethyl group, are the esters of pentaerythrite phosphite. There is nothing known so far about the toxicity of these substances. They are generally obtained by transesterification of carboxylic acid esters of easily volatile alcohols with pentaerythrite phosphite in the presence of alkaline catalysts; the volatile alcohol set free being eliminated from the reaction batch by distillation. Such transesterication proceeds slowly, because it is a typical organic equilibrium reaction. Furthermore, there are side reactions, for example ester condensation and transesterification of the pentaerythrite phosphite to easily volatile phosphorous acid esters, which secondary reactions may result in a considerable decrease of the yield.

It is therefore an object of the present invention to provide a phosphite serving as active component in stabilizer systems for plastic materials which is not toxic and which can be prepared in a simple manner with high yields and a high degree of purity. Since physiological acceptability is of importance in the case of an additive for plastic materials (only the use of practically non-toxic substances prevents migration of toxic components into food or semi-luxuries by way of package material etc.), another object is to ensure non-toxicity of the phosphite.

In accordance with this invention, it has been found that the hitherto unknown acetoacetic acid pentaerythrite phosphite ester meets the above requirements with respect to preparation and properties.

The present invention therefore provides the acetoacetic acid pentaerythrite phosphite ester having the following structure:

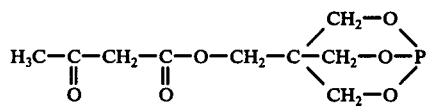

The present invention provides furthermore a process for the preparation of this ester by reaction of pentaerythrite phosphite with diketene, and the application of this ester for stabilizing plastic materials.

The pentaerythrite phosphite ester of the invention crystallizes from toluene in the form of brilliant, colorless crystals having a melting point of 84° C. It can be distilled at 160° C and 0.4 mm Hg without decomposition, and it dissolves in the usual organic solvents such as acetic acid ester, benzene or chloroform. The IR spectrum contains the absorption band of the ketocarbonyl group at 1700 cm$^{-1}$ and that of the ester carbonyl group at 1745 cm$^{-1}$. At 725 cm$^{-1}$, a broad band appears which is the characteristic of the bicyclic pentaerythrite phosphite structure.

The $LD_{50}$ value determined in mice at oral administration is higher than 5000 mg/kg of body weight. Since it cannot be excluded that, on processing the plastic materials containing this compound under aerobic conditions or by progressive action of oxygen on the finished shaped article, the phosphite will be oxidized to phosphate (which, by the way, has also a certain stabilizing effect and has not been described hitherto either), the $LD_{50}$ value of the pentaerythrite phosphate ester too has been determined, which value is higher than 8000 mg/kg of body weight. Both substances are therefore "practically non-toxic" (according to Spector, Handbook of Toxicology).

For preparing the acetoacetic acid pentaerythrite phosphite ester, the usual process of transesterification is not suitable since, under the required basic reaction conditions, there would occur not transesterification but ester condensation of acetoacetic acid ester. Therefore, the ester of the invention is obtained by addition reaction of diketene on pentaerythrite phosphite, while basic substances are used as catalysts. The reaction proceeds according to the following scheme:

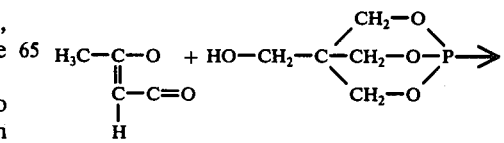

-continued

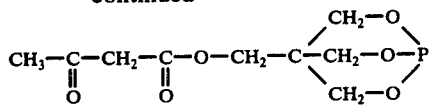

In detail, the process is the following: at a temperature of from 0° to 150° C, preferably from 20° to 100° C, and especially at about 80° C, the diketene is allowed to flow into a mixture of pentaerythrite phosphite and catalyst, optionally in the presence of a solvent, and subsequently, the batch is worked up by distillation or recrystallization. The yields are around 90% of the theoretical yield.

Suitable catalysts added in amounts of from 0.1 to 5 weight %, relative to the pentaerythrite phosphite, are Lewis bases, for example alkali metal alcoholates such as sodium methylate or sodium ethylate, sodium acetate, or tertiary amines such as triethylene diamine or especially triethylamine.

When the operations are to be carried out at a temperature below the melting point of the pentaerythrite phosphite (melting point 63° C), the presence of a solvent is required. Suitable solvents are for example toluene, benzene, butyl acetate or chloroform, and appropriate quantities range from about 50 to 500 weight %, relative to pentaerythrite phosphite.

There are no special requirements with respect to the quality of the pentaerythrite phosphite and of the diketene. The pentaerythrite phosphite can be obtained according to known methods, for example according to W. S. Wadsworth Jr. and W. D. Emmons, J. Am. Chem. Soc. 84, 1962, p. 615.

The acetoacetic acid pentaerythrite phosphite of the invention has an excellent activity as stabilizer for plastic materials. In the case of polyolefins, for example polypropylene, the stability to light and heat is considerably improved by adding usual amounts (less than 1 weight %, relative to the thermoplastic material), especially in admixture with phenolic and/or sulfidic stabilizers.

The light stabilizing effect is especially surprising since generally the absorbing effect of carbonyl groups formed in polyolefins by oxygen attack is made responsible for an accelerated oxidative degradation of the plastic material in ultraviolet light, and since it therefore should have been expected that the carbonyl group of the phosphite ester would adversely affect the plastic material.

By phenolic and sulfidic stabilizers, there are to be understood the usual heat and light stabilizers employed in plastics processing, for example 3,5-di-tert.-butyl-4-hydroxyphenyl-propionic acid ester, 2,6-di-tert.-butyl-p-cresol, alkylidene-bis-alkylphenols, esters of bis-(4'-hydroxy-3'-tert.-butylphenyl)-butanoic acid, thiodipropionic acid esters of fatty alcohols, and dioctadecyl sulfide or dioctadecyl disulfide.

A synergistically active stabilizer combination for the processing of halogen-free poly-α-olefins such as high, medium or low pressure polymers of α-olefins having from 2 to 4 carbon atoms, especially polyethylene and polypropylene, or of copolymers of such α-olefins comprises for example, relative to 100 parts by weight of polymer, from 0.05 to 3 parts by weight of a phenolic stabilizer, from 0.1 to 3 parts by weight of a sulfidic stabilizer, and from 0.05 to 5, preferably from 0.1 to 3 parts by weight of acetoacetic acid pentaerythrite phosphite ester. If necessary, a special ultraviolet stabilizer in an amount of from 0.01 to 3 parts by weight may be added to this mixture. From the great number of commercial UV absorbents, there may be cited the following compounds as examples: alkoxyhydroxy-benzophenones, hydroxyphenyl-benzotriazoles, salicyclic acid phenol ester, benzoic acid hydroxyphenol ester, benzylidene-malonic acid mononitrile ester, or so-called quenching agents such as nickel chelates, hexamethylphosphoric acid triamide, or also the recently offered piperidine stabilizers.

When chlorine containing vinyl homo- and copolymers are to be processed, for example polyvinyl chloride, polyvinylidene chloride, polyvinyl chloroacetate or vinyl chloride/α-olefin copolymers, the addition of acetoacetic acid pentaerythrite phosphite ester, in the presence of metal compounds known as stabilizers, epoxy stabilizers and optionally polyhydric alcohols, improves also the heat and light stability.

By metal compounds known as stabilizers, there are to be understood in this case calcium, barium, strontium, zinc, cadmium, magnesium, aluminum or lead soaps of aliphatic carboxylic acids or oxycarboxylic acids having from about 12 to 32 carbon atoms, salts of the cited metals with aromatic carboxylic acids (benzoates, salicylates), or (alkyl)phenolates of these metals, furthermore organo-stannic compounds, for example dialkyl-stannic thioglycolates and dialkyl-stannic carboxylates.

Known epoxy stabilizers are for example epoxidized higher fatty acids or oils such as epoxidized soya bean oil, tall oil or linseed oil, or epoxidized butyl oleate.

Suitable polyhydric alcohols are for example pentaerythritol, trimethylolpropane, sorbitol or mannitol; that is, preferably alcohols having 5 or 6 carbon atoms and from 3 to 6 OH groups.

A stabilizer combination for the processing of halogen containing plastic compositions may for example comprise, relative to 100 parts by weight of polymer, from 0.05 to 5 parts by weight of acetoacetic acid pentaerythrite phosphite ester, from 0.1 to 10 parts by weight of a metal compound known as stabilizer, from 0.1 to 10 parts by weight of a known epoxy stabilizer, and from 0 to 1 part by weight of a polyhydric alcohol.

By adding mixtures of the acetoacetic acid pentaerythrite phosphite ester of the invention and known stabilizers, the stability not only of polyolfins and compositions on the basis of polyvinyl chloride may be improved, but also the stability of polyesters, polyamides, phenol-formaldehyde resins, epoxy resins, polystyrene, polyacrylonitrile, polycarbonates, polysiloxanes, polyethers, polyurethanes and SBR mixtures.

The following examples illustrate the invention.

EXAMPLE 1

170 g (1.04 mol) of pentaerythrite phosphite are introduced into a three-necked flask provided with agitator, reflux condenser, dropping funnel and internal thermometer, and heated to 80° C. As soon as the pentaerythrite phosphite is in molten state (melting point 61° C), 3 g of distilled triethylamine are added, and 84 g (1 mol) of diketene are added dropwise from the dropping funnel within 1 hour. The internal temperature is maintained at 80° C by ice cooling. When the reaction is complete, the batch is distilled at 0.4 mm Hg. The main fraction passes over at 160° C. 220 g (89% of the theoretical yield) of a crystallized product are obtained which, recrystallized from toluene, has a melting point of 84° C.

| $C_9H_{13}PO_4$ | calculated | found |
|---|---|---|
| C | 43.6 % | 43.8 % |
| H | 5.2 % | 5.3 % |

EXAMPLE 2

For an examination of the acute toxicity of the acetoacetic acid pentaerythrite phosphite ester and the corresponding phosphate ester easily obtainable from the phosphite ester, feeding tests in male albino mice were carried out according to Leopold Teer, Grundlagen der experimentellen Arzneimittelforschung, 1965 edition. The $LD_{50}$ values were determined after administration in 1% methyl-cellulose solution.

For the acetoacetic acid pentaerythrite phosphite ester, an $LD_{50}$ value of more than 5000 mg, and for the acetoacetic acid pentaerythrite phosphate ester, an $LD_{50}$ value of 8000 mg per kg of body weight was the result.

The acetoacetic acid pentaerythrite phosphate ester was prepared as follows: 9 g (36 millimols) of acetoacetic acid pentaerythrite phosphite ester were dissolved in 25 ml of isopropanol, the solution was cooled with ice, and 3.6 g (36 millimols) of 34% hydrogen peroxide were added with agitation. Agitation was continued for 3 hours at room temperature, and subsequently, the batch was cooled with carbon dioxide snow, which caused the phosphate to precipitate. It was then filtered off and recrystallized from acetic acid ester.

| $C_9H_{13}PO_7$ | calculated | found |
|---|---|---|
| C | 40.9 % | 40.6 % |
| H | 4.9 % | 5.1 % |

The IR spectrum shows the band of the ester carbonyl group at 1740 cm$^{-1}$, the band of the ketocarbonyl group at 1715 cm$^{-1}$ and the broad band of the P=O bond at about 1300 cm$^{-1}$.

EXAMPLE 3

In a two roller mill, a mixture of
100 parts by weight of unstabilized polypropylene powder having a density of 0.96 (melt index $i_5$ about 6 g/10 min., determined according to ASTM D 1238-62 T),
0.15 part by weight of lauryl-thiodiprionic acid ester
0.10 part by weight of a bis-(4'-hydroxy-3'-tert.-butyl-phenyl)-butanoic acid ester,
0.20 part by weight of calcium stearate and
0.30 part by weight of acetoacetic acid pentaerythrite phosphite ester was homogenized for 5 minutes at 200° C. The plastic material melt was then molded at 200° C to form a plate having a thickness of 1 mm. Test specimens according to German Industrial Standard DIN 53 455 were then cut from the cold plate.

In order to determine the light stability, the specimens were subjected to irradiation with changing light in an UV radiation apparatus (Xenotest 150 of Messrs. Quarzlampen GmbH, Hanau, Federal Republic of Germany). The radiation intensity was modulated by means of 6 IR filters and 1 UV window (according to DIN 53 387). The irradiation time in hours (= residence time) was measured, that is, the time which has passed until the ultimate tensile strength has decreased to 10%. The tensile strength was determined by means of a tensile strength test machine at a draw-off speed of 5 cm/min.

In the case of the polypropylene stabilized with the phosphite of the invention, the residence time was 750 hours. Comparative test specimens made according to the above formulation, but without addition of acetoacetic acid pentaerythrite phosphite ester, had a residence time of only 580 hours.

Discoloration was not observed on any of the specimens.

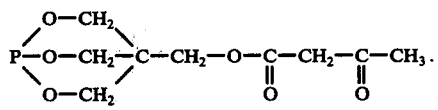

What is claimed is:
1. Acetoacetic acid pentaerythrite phosphite ester of the formula